United States Patent [19]

Farr

[11] 4,387,934
[45] Jun. 14, 1983

[54] ANTI-SKID BRAKING SYSTEMS FOR VEHICLES

[75] Inventor: Glyn P. R. Farr, Warwickshire, England

[73] Assignee: Lucas Industries, Limited, Birmingham, England

[21] Appl. No.: 275,669

[22] Filed: Jun. 22, 1981

[30] Foreign Application Priority Data

Jul. 8, 1980 [GB] United Kingdom ............... 8022282

[51] Int. Cl.³ .......................................... B60T 8/087
[52] U.S. Cl. .................................... 303/116; 303/115
[58] Field of Search ............. 188/181 A; 303/61, 113, 303/115, 116

[56] References Cited

U.S. PATENT DOCUMENTS 3,514,161  5/1970  Frayer .................................. 303/116
3,524,684  8/1970  Skoyles ................................ 303/116

Primary Examiner—Duane A. Reger
Attorney, Agent, or Firm—Scrivener, Clarke, Scrivener and Johnson

[57] ABSTRACT

In a braking system a dump valve opens during an imminent skid condition to dump fluid from a brake circuit to a reservoir space. A reservoir piston defining a boundary of the reservoir space then moves in a first bore against a spring so that a control rod, integral with the reservoir piston, allows a ball valve member to engage with its seat to cut-off communication between a master cylinder and a wheel brake. Simultaneously, fluid flows from the reservoir space through an inlet valve to a working chamber of a pump provided in a second bore in the reservoir piston so that a pump piston working in the bore engages with a rotatable eccentric. Fluid is then pumped from the pump chamber, past an outlet valve through an outlet passage in the control rod, and returned to the reservoir space through the open dump valve.

14 Claims, 1 Drawing Figure

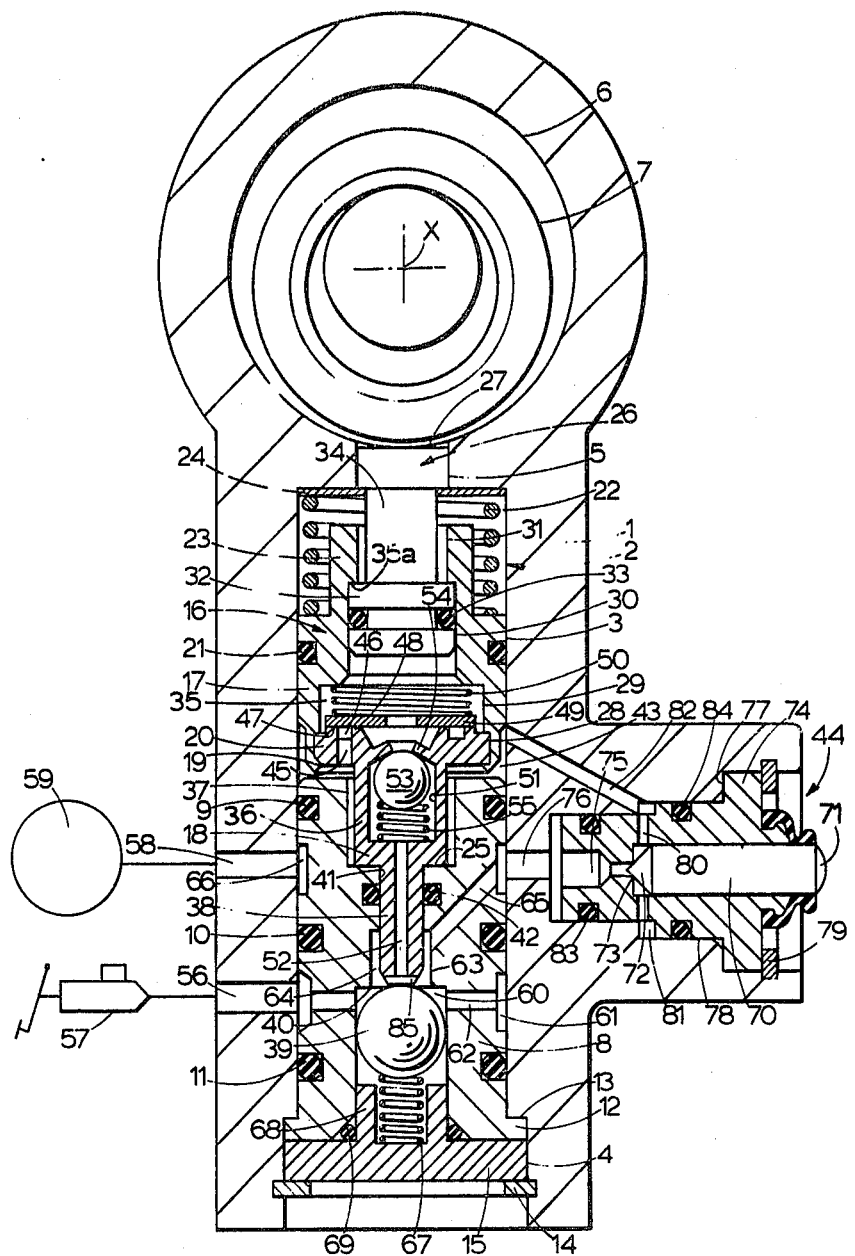

ANTI-SKID BRAKING SYSTEMS FOR VEHICLES

SPECIFIC DESCRIPTION

This invention relates to vehicle anti-skid braking systems and modulator assemblies therefor, the braking systems being of the kind comprising an hydraulic master cylinder connected to a brake circuit including a wheel brake, a modulator assembly comprising a dump valve responsive to a skid-condition sensing means for dumping fluid from the brake circuit to a reservoir space bounded by a movable wall of the modulator assembly, and a pump for recovering fluid from the reservoir space. Such a braking system will hereinafter be referred to as a 'braking system of the kind set forth'.

In some proposed systems of the kind set forth the pump is arranged to pump fluid back into the pressure space of the master cylinder while the master cylinder is isolated from the wheel brake by a cut-off valve which closes on dumping of the fluid, and in other proposed systems of this kind the fluid is pumped back into that portion of the brake circuit which remains in communication with the wheel brake.

In the previously proposed systems the piston of the pump and the movable wall have been independent members arranged in separate chambers of the modulator assembly.

According to one aspect of the invention in a braking system of the kind set forth the modulator assembly comprises a housing, the movable wall comprises a reservoir piston which is slidable in a first bore formed in the housing, and the working chamber of the pump is provided in a second bore in the reservoir piston, the displacement member of the pump being sealed to the wall of the second bore.

The pump displacement member is preferably a piston which is slidably sealed in the second bore, but a diaphragm may be used instead of a pump piston.

Preferably the first and second bores are coaxial with each other, and the arrangement is such that the direction of movement of the pump displacement member relative to the reservoir piston on the delivery stroke of the displacement member is the same as the direction of movement of the reservoir piston relative to the housing during supply of fluid from the reservoir space. The pressure of the trapped fluid in the reservoir space may then be arranged to support the force applied to the reservoir piston during the delivery stroke of the pump.

Inlet and outlet passages to the pump chamber are preferably both arranged in the reservoir piston, although if desired, when a pump piston is used, one or both passages may be arranged in the pump piston.

The inlet valve to the pump chamber preferably comprises a plate valve member which cooperates with a valve seat formed on a surface of the reservoir piston which defines the inner end of the second bore.

The valve plate is preferably in the form of a washer, and the pump outlet valve then conveniently comprises a ball valve member located in an outlet passage of the reservoir piston which communicates with the hole in the washer.

A cut-off valve for isolating an inlet port of the modulator connected to the master cylinder from an outlet port connected to the wheel brake is preferably controlled by movement of the reservoir piston relative to the housing.

Preferably the cut-off valve comprises a valve member which is normally held off its seat by a valve control member connected to the reservoir piston.

The valve control member preferably comprises an integral end portion of the reservoir piston of reduced diameter, and conveniently the end portion is provided with said outlet passage leading from the pump outlet valve.

According to another aspect of the invention in a braking system of the kind set forth the pump comprises an eccentric which is driven by suitable means, and a pump piston is normally held clear of the eccentric by a stop which is movable with the movable wall, the arrangement being such that displacement of the movable wall on dumping of fluid to the reservoir space enables the pump piston to move into engagement with the eccentric.

When the braking system is also in accordance with the first aspect of the invention, the stop preferably comprises a radial shoulder on the reservoir piston which is engageable with a step on the pump piston.

The invention will now be further described, by way of example only, with reference to the accompanying drawing which is a longitudinal cross-section of a modulator assembly connected into a vehicle braking system, the parts of the modulator assembly being shown in the normal, un-actuated condition of the assembly.

Modulator housing 1 is provided with a longitudinal stepped bore 2, the first bore, comprising a main bore portion 3 of uniform diameter, a counterbore 4 at the lower end, and a reduced diameter bore portion 5 at the upper end, the bore portion 5 breaking radially into a transverse bore 6 in which a pump eccentric 7 is rotatably mounted about an axis X. The eccentric 7 is driven continuously, by the vehicle engine, transmission, wheel, or other suitable means. A cylindrical valve body 8 is sealed in bore portion 3 by three axially spaced annular seals 9, 10 and 11 located in respective external annular recesses in the body 8, and is secured axially in position by a locking ring 14 and a plate 15 which holds a flange 12 at the lower end of valve body 8 against step 13 between bore portion 3 and counterbore 4.

A reservoir piston 16 comprises independently formed upper and lower piston parts 17 and 18 which are secured together by a flange 19 on the lower end of the upper piston part 17 which is swaged around a radially outwardly directed flange 20 at the upper end of lower piston part 18.

Upper piston part 17 is slidably sealed in bore portion 3 by an annular seal 21 received in an external annular groove in the piston part 17, and the reservoir piston 16 is biassed downwardly relative to modulator housing 1 by a coiled compression spring 22 which fits over a tubular spigot 23 on the upper end of piston part 17 and bears at its upper end against a washer 24 in the upper end of bore portion 3. The upper piston part 17 is provided with a multi-stepped bore comprising bore portions 28, 29, 30 and 31 of progressively smaller diameters. Flange 20 abuts the shoulder between bore portions 28 and 29, and a head 32 at the lower end of pump piston 26 is slidably sealed in intermediate bore portion 30 by an annular seal 33 carried in an external annular recess in the piston head 32. A reduced diameter stem 34 of the piston 26 extends with substantial clearance through the bore portion 31 of spigot 23.

A pump chamber 35 is defined in bore portions 29 and 30 beneath the piston head 32.

The pump piston 26 is normally held disabled in the position shown by engagement of the shoulder 35a between bore portions 30 and 31 with the upper end of the pump piston head 32, under the force of spring 22 which holds the reservoir piston 16 against a shoulder 25 on valve body 8. In this position the upper end 27 of the pump piston 26 is just clear of the rotatable eccentric 7.

The lower part 18 of the reservoir piston 16, in addition to the flange 20, comprises a middle portion 36 which is received with radial clearance in a counterbore 37 in the upper end of valve body 8, and a lower portion in the form of an integral tubular valve control rod 38 which normally holds a ball valve member 39 off its seat 40 under the action of spring 22. The control rod 38 is sealed in a reduced diameter bore portion 41 of valve body 8 by an annular seal 42.

A reservoir chamber 43, to which fluid is dumped during an imminent skid situation under the control of a dump valve assembly 44, is defined between the piston 16 and the valve body 8 in bore portion 3 and is sealed by seals 9, 21 and 42. An inlet passage to the pump chamber 35 from the reservoir chamber 43 is provided by a port 45 extending axially through flange 20 and communicating with a valve chamber 46 formed by an annular recess in the upper face of flange 20 between co-axial valve seats 47 and 48 engaged by a plate valve member in the form of a washer 49 biassed by a light coiled compression spring 50.

An outlet passage from the pump chamber 35 is provided by a bore 51 in middle portion 36 of lower reservoir piston part 18 which communicates with the axial bore 52 of valve control rod 38. An outlet valve from the pump chamber 35 is provided by a further ball valve member 53 which is located within bore 51 and is urged by a spring 55 into engagement with a frustoconical seat 54 formed at the mouth of bore 51. The seat 54 communicates freely on its upper side with pump chamber 35 by way of the central hole in washer 49.

Ball valve member 39 controls communication between a radial inlet port 56, connected to the pressure space of a pedal-operated hydraulic master cylinder 57, and a radial outlet port 58 connected to a wheel brake 59. Port 56 communicates freely with an inlet valve chamber 60 beneath seat 40 in valve body 8, by way of an external annular recess 61 in valve body 8, sealed by seals 10 and 11, and through a series of circumferentially spaced radial ports 62. Bore portion 41 is provided at its lower end with a counterbore 63 which defines with the control rod 38 an annular space 64 providing communication between the upper side of seat 40 and an inclined passage 65 which breaks into a further external annular recess 66 in valve body 8 which is connected to port 58 and is sealed by seals 9 and 10. Valve member 39 which acts as a cut-off valve during an imminent skid-condition to isolate the master cylinder 57 from the wheel brake 59, is biassed upwardly by a coiled compression spring 67 which is located substantially within an upstanding tubular spigot 68 integral with plate 15 and sealed to the valve body 8 by an annular seal 69. Spring 67 has a lower fitted load than spring 22.

The dump valve assembly 44 comprises an operating rod 70 having a domed outer end 71 which is operable by a lever, not shown, of a skid-condition detecting mechanism, not shown, of known construction. The skid-condition detecting mechanism may be a mechanical device, or it may comprise a solenoid which receives a signal from an electrical detector. The details of this mechanism are not relevant to the present invention, but the arrangement is such that the lever normally urges the control rod 70 inwardly so that its coned inner end 72 engages with a valve seat 73 provided in a dump valve body 74, but on detection of an imminent skid-condition the rod 70 is permitted to move outwards under the pressure of fluid in the axial inlet port 75 which is connected to recess 66 by a transverse passage 76 in housing 1. The valve body 74 is of stepped outline and retained against a step 77 in transverse bore 78 of housing 1 by a retaining ring 79. The opposite side of valve seat 73 from port 75 communicates with the reservoir chamber 43 by way of a series of radial ports 80 in dump valve body 74, an annular chamber 81 and an inclined passage 82 in housing 1. Annular passage 81 is sealed by axially spaced seals 83 and 84.

The operation of the modulator assembly will now be described. In the normal condition shown the master cylinder 57 communicates freely with the wheel brake by way of the open cut-off valve 39, 40 inclined passage 65 and port 58. When the mechanical detector, not shown, senses an imminent skid-condition the retaining force on rod end 71 is relieved to allow the dump valve, valve member 72 and seat 73, to open and allow brake fluid to pass from port 76 to the reservoir chamber 43 by way of inclined passage 82. Reservoir piston 16 is thereby moved upwards against the force of spring 22 with the result that the valve member 39 is allowed by control rod 38 to engage seat 40 and cut-off the inlet port 56 from outlet port 58. Simultaneously, the pump piston 26 is allowed to engage with the eccentric 7.

During upward movement of the reservoir piston 16 the pump chamber 35 is primed with fluid from the reservoir chamber 43 which by way of passage 45 pushes open the valve plate 39 against the force of spring 50. On a downward stroke of the pump piston 26 the reservoir piston is supported in position by the pressure of dumped fluid in the reservoir chamber 43, and fluid is pumped from the pump chamber 35 past the pump outlet valve, ball valve member 53 and seat 54, to the chamber 64 by way of passage 52, and thence back to the reservoir chamber 43 by way of inclined passage 65, open valve seat 73 of the dump valve, and inclined passage 82. Thus the fluid in the reservoir chamber is merely circulated by the pump while the dump valve, 72, 73 remains open.

On termination of the detected imminent skid condition the control rod 70 is moved inwards again to close the dump valve seat 73 so that the fluid pumped through inclined passage 65 is directed to the outlet port 58 and results in a progressive increase in wheel brake pressure. As the fluid is progressively pumped from the reservoir chamber 43 the reservoir piston moves downwardly to bring control rod 38 into re-engagement with ball valve member 39. A transverse recess 85 in the free end of control rod 38 provides free communication between passage 52 and chamber 64 in this condition. Valve member 39 is held in its closed position by the force of spring 67 and the differential pressure between the master cylinder and that of the wheel brake acting on the valve member 39. When the available fluid in reservoir 43 has been pumped back to the outlet port 58, the pressure difference across valve member 39 becomes small enough to allow the spring 22 to remove valve member 39 from seat 40 to re-establish communication between inlet port 56 and outlet port 58, and to draw pump piston 26 clear of eccentric 7. However, if the force of the applied pressure in inlet valve chamber 60 acting over the lower end of rod 38 exceeds the force of the spring 22, the ball valve member 39 will remain closed, and this prevents the wheel brake from being over-pressurised.

I claim:

1. An anti-skid braking system for a vehicle comprising a brake circuit including a wheel brake, an hydraulic master cylinder connected to said brake circuit, a modulator assembly comprising a housing having a first bore, a reservoir piston, a reservoir space bounded by said reservoir piston, and a dump valve responsive to a skid signal for dumping fluid from said brake circuit to said reservoir space, a pump for recovering fluid from said reservoir space and comprising a pump displacement member, a pump chamber bounded by said pump displacement member, and driving means for said pump displacement member, an inlet passage to said pump chamber from said reservoir space, and an outlet passage from said pump chamber to said brake circuit, said reservoir piston being slidable in said first bore and being provided with a second bore, said pump chamber being provided in said second bore in said reservoir piston, and said pump displacement member being sealed to the wall of said second bore.

2. A braking system as claimed in claim 1, wherein said first and second bores are coaxial with each other, and said modulator assembly and said pump are arranged such that the direction of movement of said pump displacement member relative to said reservoir piston on the delivery stroke of said displacement member is the same as the direction of movement of said reservoir piston relative to said housing during supply of fluid from said reservoir space.

3. A braking system as claimed in claim 1, wherein said reservoir piston is provided with both said inlet and outlet passages.

4. A braking system as claimed in claim 3, wherein an inlet valve is provided between said inlet passage and said pump chamber and comprises an inlet valve seat formed on said reservoir piston and a plate valve member engageable with said inlet valve seat.

5. A braking system as claimed in claim 4, wherein an outlet valve is provided between said pump chamber and said outlet passage and comprises an outlet valve seat formed on said reservoir piston and a ball valve member which is located in said outlet passage and is engageable with said outlet valve seat, said plate valve member comprising a washer having a central hole which communicates with said outlet passage through said outlet valve.

6. A braking system as claimed in claim 1, further comprising an inlet port of said modulator assembly connected to said master cylinder, an outlet port of said brake circuit connected to said wheel brake, and a cut-off valve for isolating said inlet port from said outlet port, operation of said cut-off valve being controlled by movement of said reservoir piston relative to said housing.

7. A braking system as claimed in claim 6, wherein a valve control member is connected to said reservoir piston, and said cut-off valve comprises a valve seat and a valve member engageable with said seat, said valve member being normally held out of engagement with said seat by said valve control member.

8. A braking system as claimed in claim 7, wherein said valve control member comprises an integral end portion of said reservoir piston of reduced diameter.

9. A braking system as claimed in claim 8, wherein said end portion of said reservoir is provided with said outlet passage from said pump chamber.

10. A braking system as claimed in claim 1, wherein said displacement member comprises a pump piston slidably sealed in said second bore.

11. A braking system as claimed in claim 1, wherein said driving means of said pump comprises a rotatable eccentric engageable with said pump displacement member, and further comprising a stop carried by said reservoir piston and engageable with said displacement member for normally holding said displacement member clear of engagement with said eccentric, whereby displacement of said reservoir piston caused by dumping of fluid to said reservoir space enables said displacement member to move into engagement with said eccentric.

12. A braking system as claimed in claim 11, wherein said second bore in said reservoir piston comprises a stepped bore, said displacement member comprises a pump piston which has a step and is slidably sealed in said bore, and said stop comprises a radial shoulder on said reservoir piston which is engageable with said step on said pump piston.

13. A braking system as claimed in claim 6, wherein said driving means of said pump comprises a rotatable eccentric engageable with said pump displacement member, a spring is provided for urging said displacement member out of engagement with said eccentric, and said reservoir piston is arranged to move against the force in said spring to cause said cut-off valve to open.

14. A braking system as claimed in claim 1, wherein said dump valve comprises a dump valve seat and a dump valve member normally urged into engagement with said dump valve seat, said dump valve member being permitted to move away from said dump valve seat under the pressure of fluid in said brake circuit in response to a skid signal to dump fluid from said brake circuit to said reservoir space.

* * * * *